US006405928B1

(12) United States Patent
Muramatsu et al.

(10) Patent No.: US 6,405,928 B1
(45) Date of Patent: Jun. 18, 2002

(54) PC CARD CONNECTOR

(75) Inventors: Hidenori Muramatsu, Kanagawa; Satoru Watanabe, Tokyo, both of (JP)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/381,070

(22) PCT Filed: Mar. 13, 1998

(86) PCT No.: PCT/US98/04963

§ 371 (c)(1), (2), (4) Date: Sep. 14, 1999

(87) PCT Pub. No.: WO98/40934

PCT Pub. Date: Sep. 17, 1998

(30) Foreign Application Priority Data

Mar. 13, 1997 (JP) .......................................... 9-078897

(51) Int. Cl.[7] ............................................ G06K 13/00
(52) U.S. Cl. ...................................... 235/475; 235/479
(58) Field of Search ................................ 235/475, 474, 235/483, 486; 489/157, 155, 159, 160

(56) References Cited

U.S. PATENT DOCUMENTS 5,578,811 A * 11/1996 Suzuki ....................... 235/479
5,648,651 A * 7/1997 Inoue ......................... 235/475
6,182,899 B1 * 2/2001 Muller et al. ............... 235/475
6,186,402 B1 * 2/2001 Johnson ...................... 235/475

FOREIGN PATENT DOCUMENTS

JP 546816 A1 * 2/1993 ................ 235/475

OTHER PUBLICATIONS

Japanese Patent Application No. 8–96891.

* cited by examiner

*Primary Examiner*—Michael G. Lee
*Assistant Examiner*—Daniel St. Cyr

(57) ABSTRACT

The present invention provides a PC card connector which has a small number of parts, and which makes it possible to obtain good operating characteristics and a low-operating force by means of a relatively simple structure. A guide plate assembly (70) of the PC card connector has a guide plate (32) which has guide grooves (80, 84) and a circular cam groove (82); furthermore, the guide plate assembly (70) also has pressing-bar assemblies (72*a*, 72*b*) which are disposed on both sides of the guide plate 32. Each of the pressing-bar assemblies (72*a*, 72*b*) has a swinging plate (76) which is pivot mounted on a pin (74) in a front portion. Pins (74, 77) and projection (89) of the pressing-bar assembly (72*a*) respectively slide along a guide groove (80), circular cam groove (82) and guide groove (84) of the guide plate (32) in accordance with the operation of the pressing-bar assembly (72*a*). When the knob (26) is pressed, the swinging bar (76) is displaced in a lateral direction and engages with an eject bar (24) so that the eject bar is pushed thereby operating an ejection member (16) to eject a PC card (2) from the card connector.

4 Claims, 9 Drawing Sheets

PC CARD CONNECTOR

FIELD OF THE INVENTION

The present invention relates to a PC card connector, and more specifically relates to a PC card connector which has a structure in which a pressing bar does not protrude at times other than when a PC card is being ejected.

BACKGROUND

PC card connector 200 disclosed in Japanese Patent Application No. 8-96891 is universally known as a conventional PC card connector. In PC card connector 200, as shown in FIG. 11, an ejector member 204 is installed in a frame 202 attached to a main body so that ejector member 204 can slide. A spring 206 is attached to the ejector member 204. Engaging end 208 of spring 206 moves through a first circular cam groove (not shown), and positions the ejector member 204 in an outer position whereby the ejector member 204 protrudes to the right from the frame 202, or an inner position in which the ejector member 204 is pushed into the frame 202. A front edge of the ejector member 204 has an "L" shape, and an intermediate the bar 210 is installed which engages the edge. A guided shaft 220 of the intermediate bar 210 is guided by a second circular cam groove (not shown), and is driven by a spring 212.

When the ejector member 204 protrudes to the right, a front end 213 of the ejector member 204 moves to a rear end 214 of the intermediate bar 210, so that the intermediate bar 210 is caused to pivot upward about shaft 216 by the spring 212. Then, when the rear end 214 of the intermediate bar 210 and the front end 213 of the ejector member 204 engage each other, and the ejector member 204 is pushed inwardly, the intermediate bar 210 moves to the left with the shaft 216 being guided by the slot 222, and with the guided shaft 220 being guided by the second circular cam groove, so that the front end 218 of the intermediate bar 210 pushes the eject bar 221, thus ejecting the PC card (not shown) via an arm bar (not shown).

In the conventional example described above, when the push bottom 201 is depressed, the eject bar 221 is locked in the position which ejects the PC card; accordingly, a new PC card cannot be inserted. Furthermore, two circular cam grooves, which require a relatively large area, must be formed in a limited space, so that the structure is complicated. Moreover, a large pressing bar stroke makes it possible to obtain a low-operating force; however, since the cam grooves are small, the stroke of the pressing bar is reduced, so that a low-operating force cannot be obtained. With a single circular cam groove, the structure would be simplified, and the degree of freedom in design would be increased. Furthermore, respective springs 206 and 212 are required in order to drive the ejector member 204 and the intermediate bar 201 to the side.

SUMMARY OF THE INVENTION

A further system for ejecting circuit boards from computers is described in U.S. Pat. No. 5,558,527. This ejection system is a two-stage system having the drawback of requiring two discrete actions by an operator to eject a circuit board.

The present invention was devised in light of the above points. One feature of the present invention is to provide a PC card connector with a low-operating force which makes it possible, by means of a relatively simple structure, to insert a PC card even when the eject bar is pushed in.

Furthermore, another feature of the present invention is to provide a PC card connector which has a small number of parts.

A PC card connector of the present invention is equipped with a frame which accommodates a PC card, an ejection member which ejects the PC card, and an eject bar which drives the ejection member, the PC card connector is further equipped with a pressing bar, a swinging bar which is pivot mounted so that the swinging bar substantially overlaps with the pressing bar, and so that the swinging bar can pivot, and a guide plate which guides a free end of the winging bar, and which has a circular cam groove with an outer position that stops the pressing bar in a position at which the pressing bar is caused to protrude, and an inner position which stops the pressing bar in a position in which the pressing bar is pressed in and the swinging bar moves in a lateral direction, engages with the eject bar and presses the eject bar only when the swinging bar moves from the outer position to the inner position.

It is desirable that there be only one circular cam groove. Furthermore, it is desirable that the swinging bar be constantly pushed toward the guide plate by a spring member.

A PC card connector comprises a frame in which a PC card is received for electrical connection with an electrical connector, an ejection member pivotally mounted to the frame, a reciprocally-operated eject bar connected to one end of the ejection member for pivotally operating the ejection member to eject a PC card in the card connector, wherein a guide plate assembly is operatively connected to the eject bar to reciprocally operate the eject bar including a pressing bar and a guide plate along which the pressing bar moves, a swinging bar connected between the pressing bar and the guide plate so that when the pressing bar is moved from an initial position to a card-ejection position, the swinging bar engages the eject bar thereby moving the eject bar to a card-ejection position.

BRIEF DESCRIPTION OF THE DRAWINGS

Embodiments of the present invention will now be described by way of example with reference to the accompanying drawings in which:

FIG. 9*a* showing the pressing bar positioned in the outermost position; FIG. 9*b* showing the pressing bar in the process of being pressed; FIG. 9*c* showing the pressing bar stopped at an inner position;

FIG. 9*d* showing the pressing bar in the process of being returned after again being pressed.

DETAILED DESCRIPTION OF THE EMBODIMENT SHOWN

Figure 1:
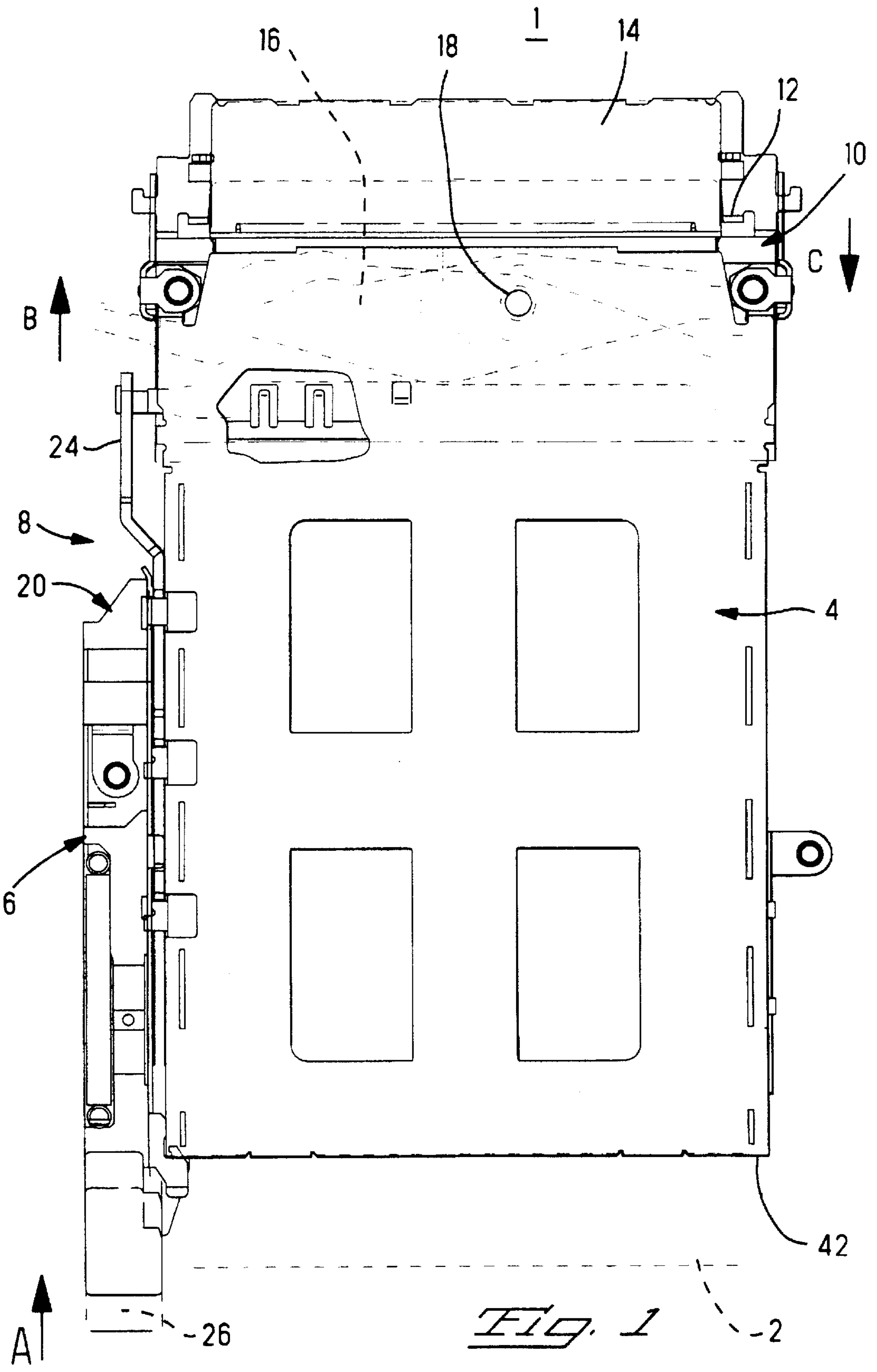
FIG. 1 is a top plan view of the PC card connector of the present invention.

FIG. 1 is a plan view of a PC card connector 1 of the present invention. Card connector 1 has a metal frame 4 which accommodates PC cards 2, an ejector mechanism 8, which is attached to the frame 4, and an electrical connector 10, which is installed on the front part of the frame 4. A flexible printed circuit (FPC) 14, which has conductive pads (not shown) is attached to a front part 12 of the connector 10. PPC 14 is electrically connected to electrical contacts (not shown) which are located in the housing of the connector 10. The conductive pads are inserted into another connector 150 (FIG. 2), and are electrically connected to electrical contacts thereof.

The ejector mechanism 8 has an ejector section 6 and an ejection member 16, which is operated by ejector section 6. The ejection member 16 is mounted so that it can pivot about a shaft 18. The ejector section 6 has a frame body 20, which is U-shaped in cross section, a pressing bar 22 (see FIG. 3), which slides along frame body 20, and an eject bar 24 which is driven backward and forward, i.e., in the direction of insertion and ejection of the PC card 2, in linkage with the pressing bar 22. A knob 26 is attached to the rear part of the pressing bar 22. When knob 26 is pushed by a person in the direction indicated by arrow A, the eject bar 24 moves in the direction indicated by arrow B; as a result, the other end of the ejection member 16 moves in the direction indicated by arrow C so that the card 2 is pushed in the ejection direction. In this way, the card 2 can be removed from the connector 1.

Figure 2:
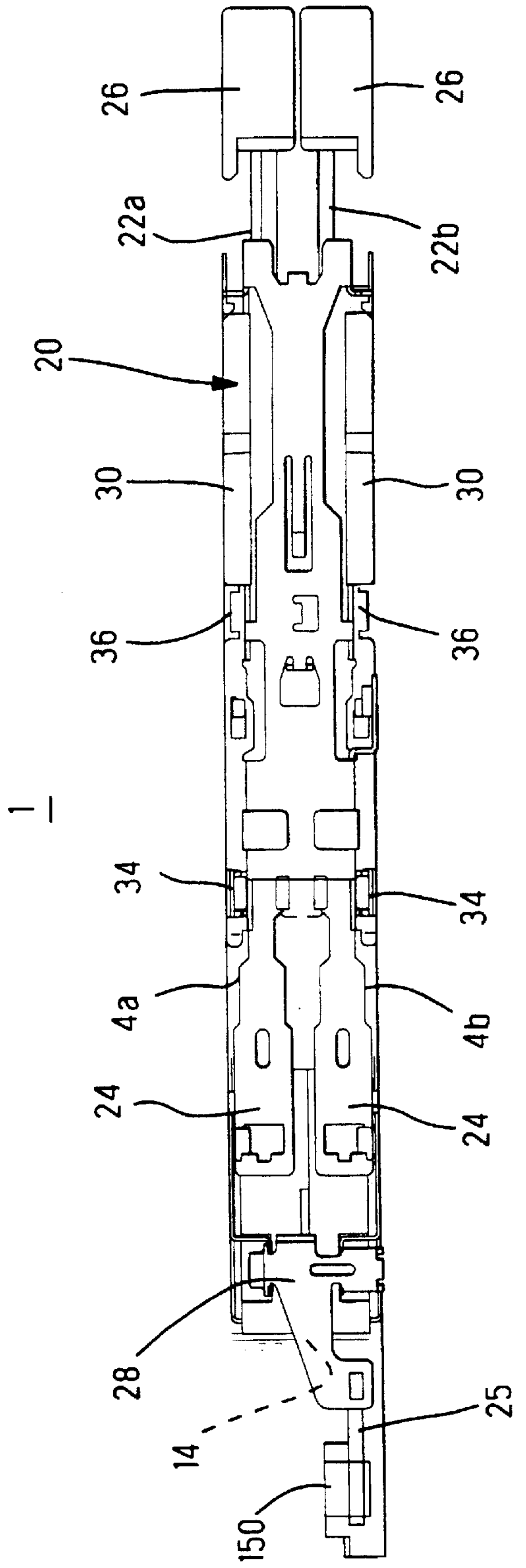
FIG. 2 is a side view of the connector shown in FIG. 1, as seen from the left side thereof.

The frame 4 is constructed by joining an upper half-frame 4*a* and a lower half-frame 4*b*, as shown in FIG. 2, which have substantially the same shape, so that the upper half-frame 4*a* and lower half-frame 4*b* face each other. Cards 2 can be accommodated in the respective half-frames 4*a* and 4*b*. Two pressing bars 22*a*, 22*b*, which can be independently operated, are contained in the ejector section 6; the upper pressing bar 22*a* and lower pressing bar 22*b* are arranged so that they respectively eject the cards 2 accommodated in the upper half-frame 4*a* and lower half-frame 4*b*. A metal slider 25, which is installed as part of the FPC 14 is used to insert the FPC 14 into the mating connector 150, and a metal bracket 28, which holds the slider 25, are shown in FIG. 2. The bracket 28 is attached to the housing of the connector 10. The respectively pressing bars 22*a* and 22*b* are constantly driven to the right by tension coil springs 30. The knob 26 is shown in its initial position, i.e., in a state at which the knob 26 is not pushed in. The card connector 1 and the connector 150 are both mounted on a circuit board (not shown).

Figure 3:
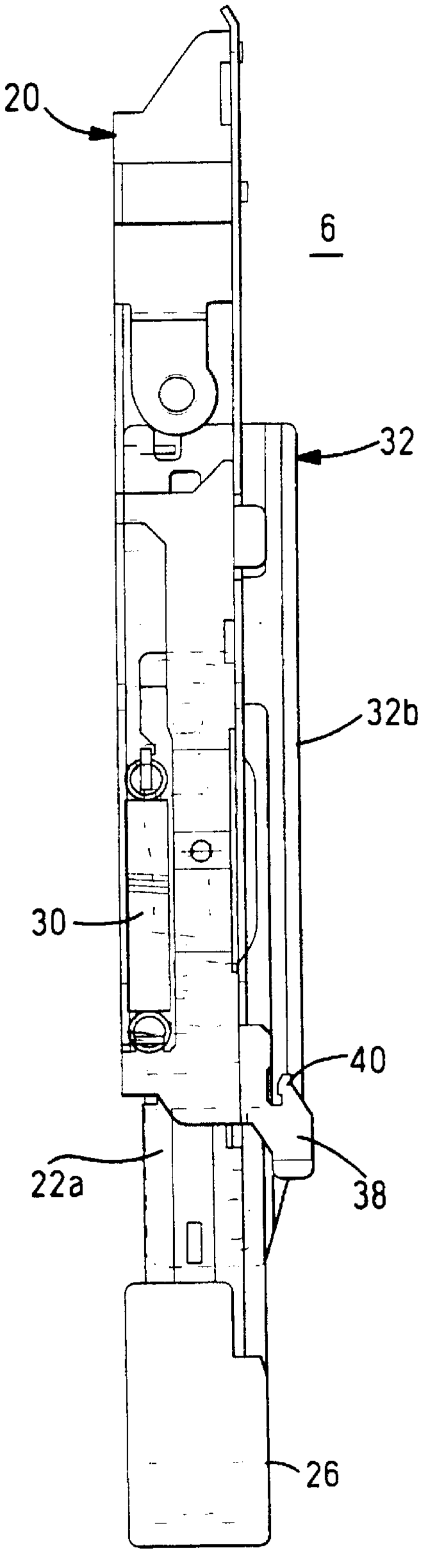
FIG. 3 is an enlarged view of an ejector member.
Figure 4:
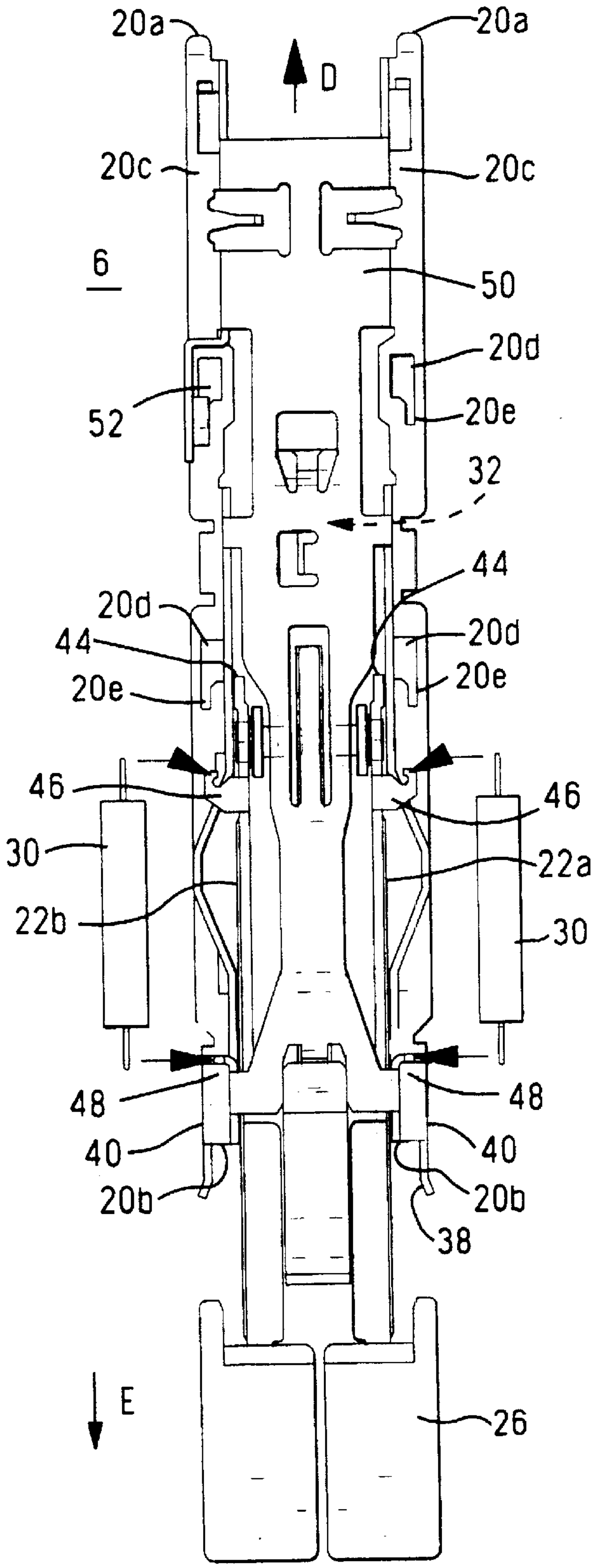
FIG. 4 is a side view of the ejector member shown in FIG. 3, as seen from the left side thereof.

FIG. 3 shows the frame body 20 of the ejector mechanism 8 removed from the frame 4 of the card connector 1. A plastic guide plate 32 is fastened inside the frame body 20 on an axial line extending in the direction of length of the frame body 20. The pressing bars 22*a* and 22*b* are installed facing each other on both sides of guide plate 32, so that the pressing bars 22*a* and 22*b* slide along the guide plate 32 (FIG. 4). The frame body 10 is attached to the frame 4 by means of projections 34 and 36 (see FIG. 2), which protrude from the frame 4, and legs 38, which are disposed on the rear end of the frame body 20. Projections 40, which face forward, are disposed on the legs 38. The attaching of the frame body 20 to the frame 4 will be described later. Since the pressing bars 22*a*, 22*b* are made of metal, plastic knobs 26 are mounted on the pressing bars so that they can easily be pushed.

Two openings 20*d* on each side of frame body 20 are formed in two flanges 20*c*, which extend from the front end 20*a* of the frame body 20 to the rear end 20*b* thereof as shown in FIG. 4. The rear sections of the openings 20*d* have narrow slots 20*a*. Openings 20*d* are formed in positions which correspond to the projections 34 and 36 of the frame 4 shown in FIG. 2. The tip ends of the projections 34 and 36 are bent, and the frame body 20 is mounted on the frame 4 so that the projections 34 and 36 enter the openings 20*d*. Next, when the frame body 20 is moved forward, i. e., in the direction indicated by arrow D, the tip ends of the projections 34 and 36 engage with the slots 20*e* of the openings 20*d*. Furthermore, the projections 40 of the legs 38 move inside the rear end 42 (see FIG. 1) of the frame 4. As a result, the frame body 20 is fastened to the frame 4. Furthermore, the right edge 32*b* of the guide plate 32 is clamped between the upper half-frame 4*a* and the lower half-frame 4*b*.

Referring now to FIG. 4, key-shaped brackets 46 protrude from the pressing bars 22*a*, 22*b* near front ends 44 thereof. Meanwhile, brackets 48 protrude from the frame body 20 near the rear ends 20*b* of the frame body 20. The ends of the springs 30 are fastened to brackets 46 and 48 as indicated by the arrows. As a result, the pressing bars 22*a*, 22*b* are constantly biased in the return direction of the knobs 26, i. e., in the direction indicated by arrow E. It will easily be understood that the guide plate 32, which is indicated by a broken line in FIG. 4, is installed in the center of the frame body 20 (with respect to the direction of width of the frame body 20). Ribs 51, 52 and 54, which are bent toward the guide plate 32, are disposed on the top surface 50 of the frame body 20 along the guide plate 32. The guide plate 32 is held in the frame body 20 by ribs 51, 52 and 54.

Figure 5:
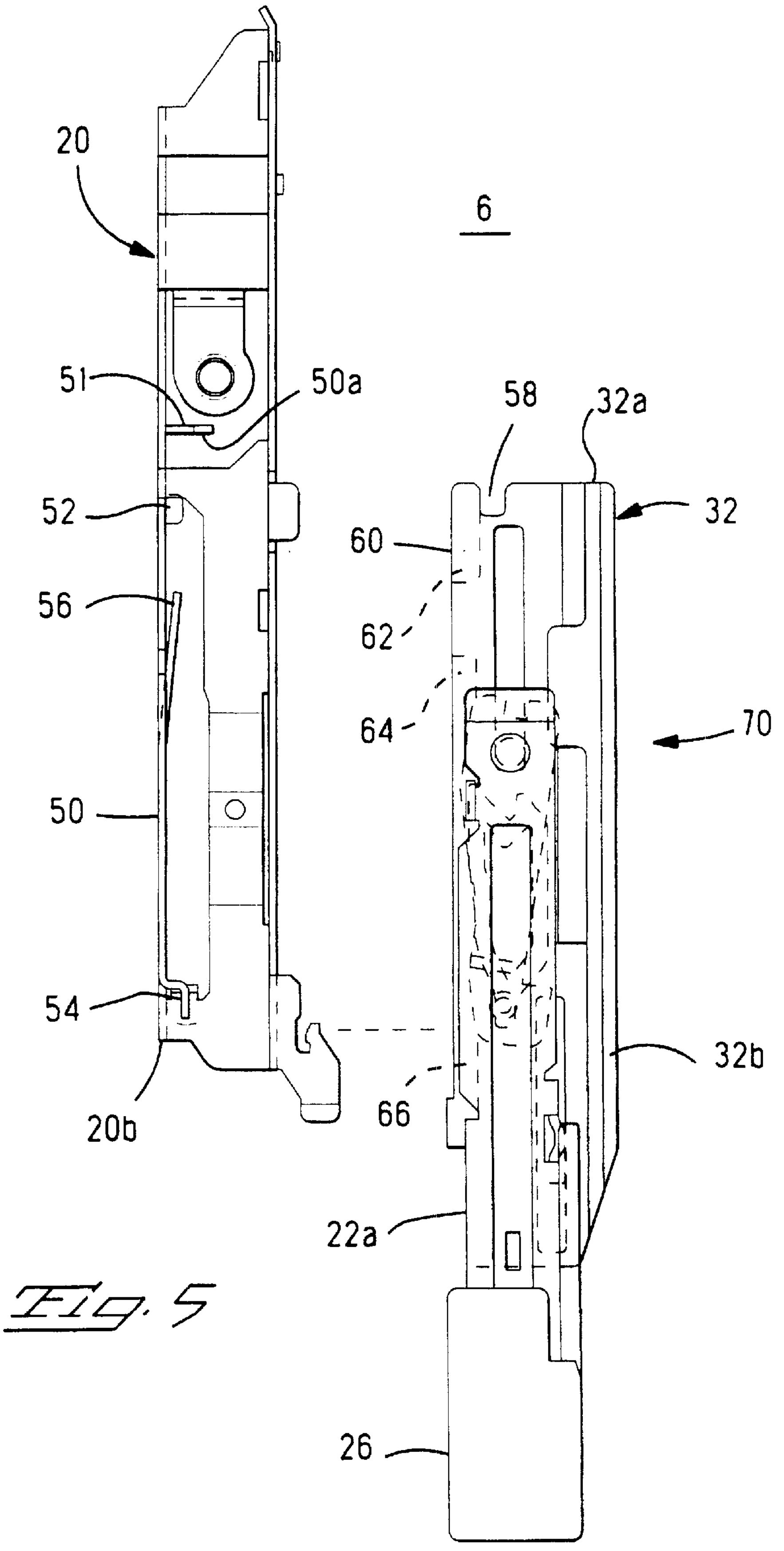
FIG. 5 is an exploded view in which the ejector member shown in FIG. 3 is partly exploded.

FIG. 5 is an exploded view, which shows the ejector section 6 shown in FIG. 3 exploded into the frame body 20 and guide plate assembly 70. Tip end portion 50*a* of the rib 51 has a T-shape. The rib 52 has a flat surface, which extends along the direction of length of the frame body 20. The rib 54 is formed into an L-shape near the rear end 20*b* of frame member 50. Furthermore, a resilient tongue 56, which faces forward, is formed by being cut and caused to project inward between ribs 54, 52 from frame member 50. A cut-out 58 is formed in the front end 32*a* of the guide plate 32, and recessed grooves 62, 64, 66 are formed in a side edge 60. Attachment of the guide plate 32 to frame body 20 is accomplished as follows: i. e., the guide plate 32 is installed inside the frame body 20 so that the front end 32*a* is positioned near the rib 51 to the rear thereof, so that the side edge 60 engages an inside surface of the frame member 50 of the frame body 20. Next, when the guide plate 32 is caused to slide forward, the resilient tongue 56 engages with the recessed groove 64, so that return of the guide plate 32 to the rear is prevented. At the same time, the tip end portion 50*a* of the rib 51 engages with the cut-out 58, and the ribs 52 and 54 respectively engage with the recessed grooves 62 and 66, so that fastening of the frame body 20 and guide plate 32 together is accomplished.

Figure 6:
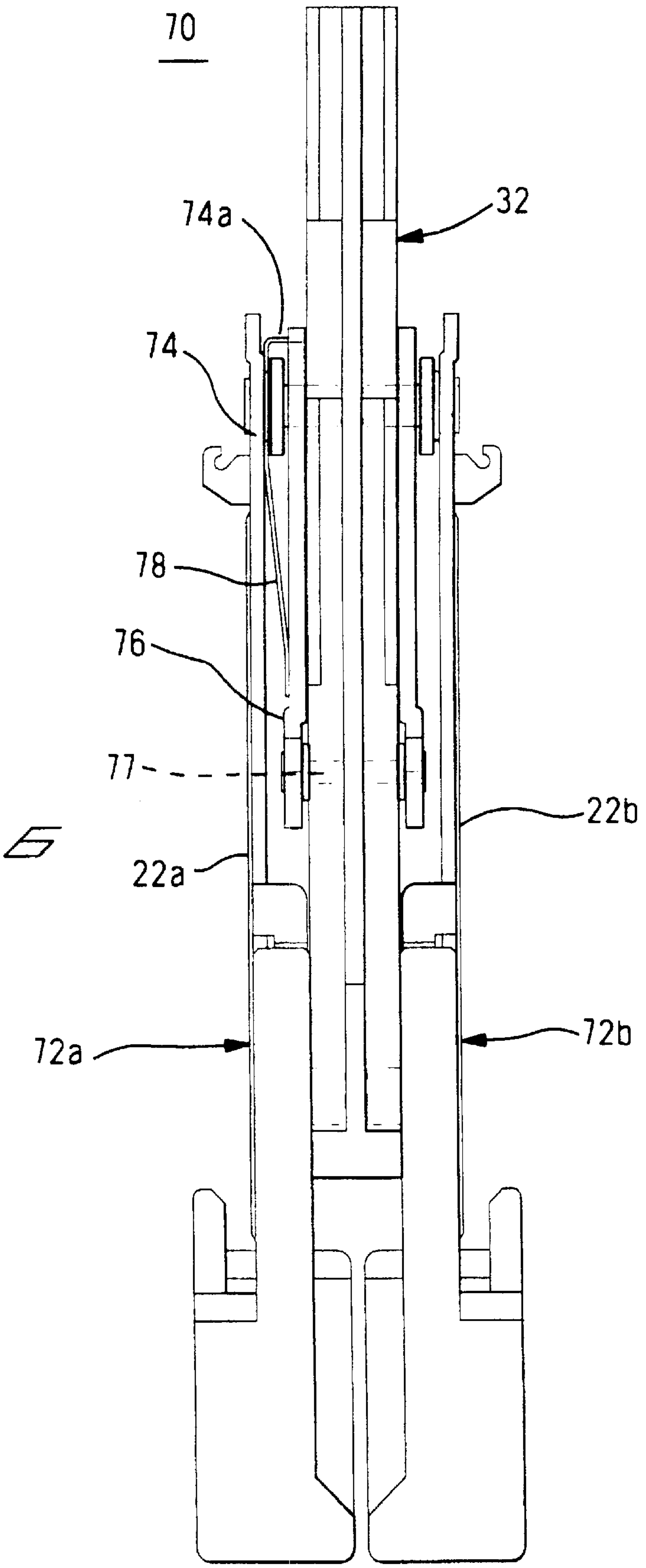
FIG. 6 is a side view of the guide plate assembly shown in FIG. 5, as seen from the right side thereof.

FIG. 6 is a side view of the guide plate assembly 70 shown in FIG. 5, as seen from the right side thereof. The guide plate assembly 70 is constructed from the guide plate 32 and pressing-bar assemblies 72*a*, 72*b*. The pressing-bar assemblies 72*a*, 72*b* are installed facing both sides of the guide plate 32. In FIG. 6, the frame body 20 is omitted; however, the pressing-bar assemblies 72*a,* 72*b* are held between the guide plate 32 and the frame body 20, and slide along the guide plate 32. The pressing bar assemblies 72*a* and 72*b* are in a mirror-image relationship; accordingly, only the pressing bar assembly 72*a* will be described below.

A pin 74 is fastened to the pressing-bar assembly 72*a* near a front end thereof. A circular flange 74*a* is disposed on the pin 74. A swinging bar 76 is mounted on pin 74 so that the swinging bar 76 can pivot on pin 74. A pin, i. e., a cam follower 77, which protrudes toward the guide plate 32, is fastened to the swinging bar 76 near the rear end thereof. The swinging bar 76 is arranged so that it swings about the pin 74. A plate spring 78 is attached and fastened to the pin 74 between the pressing bar 22*a* and the swinging bar 76. A rear end portion of the plate spring 78 presses against the swinging bar 76 so that the swinging bar 76 is constantly biased toward the guide plate 32.

Figure 7:
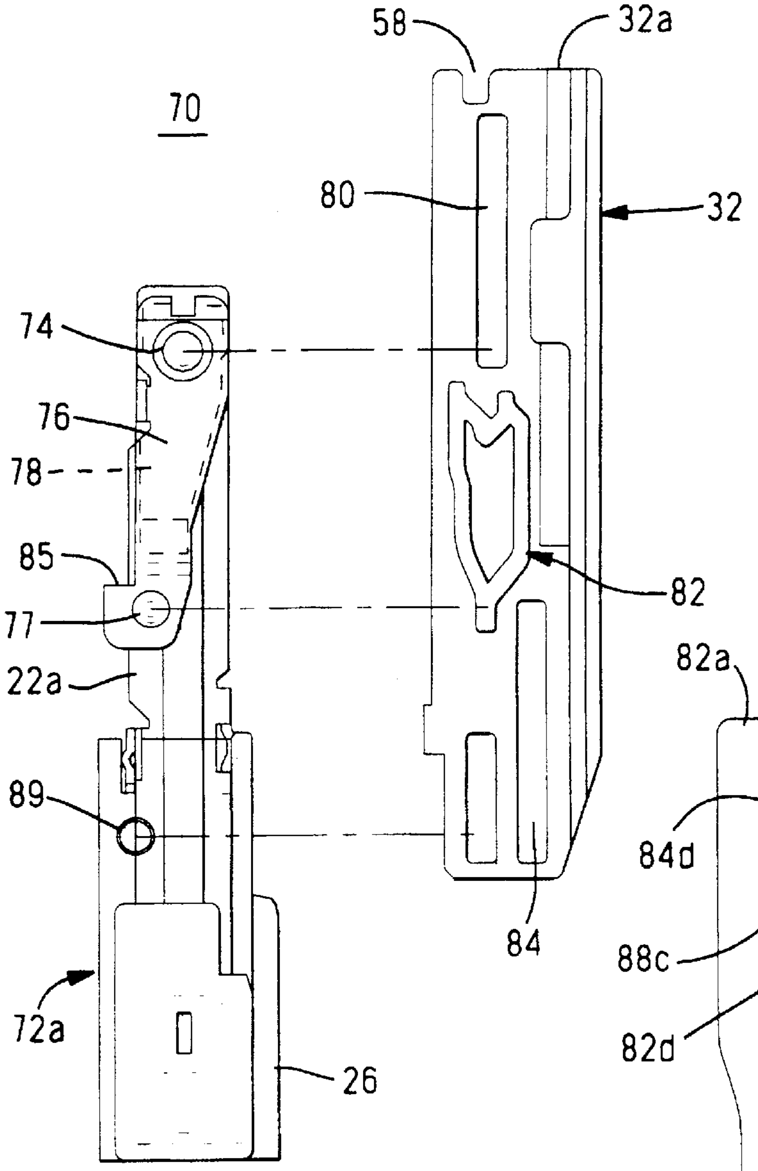
FIG. 7 is a view in which the guide plate assembly shown in FIG. 6 is exploded with one of the pressing-bar assemblies inverted.

FIG. 7 is an exploded view which shows the guide plate assembly 70 exploded into the guide plate 32 and pressing bar assembly 72*a*. The pressing bar assembly 72*b* is omitted from FIG. 7. A state is shown in which the guide plate 32 is in the same position as that shown in FIG. 5, and in which the pressing-bar assembly 72*a* is inverted 180 degrees from the position shown in FIG. 5, i. e., is turned inside out. The guide plate 32 is substantially rectangular, and a guide groove 80, which extends along an axial line in the direction of length of the guide plate 32 is formed near the front end 32*a* of the guide plate 32. A circular cam groove 82 is formed adjacent a rear end of the guide groove 80. Furthermore, a rectilinear guide groove 84 is formed in the axial direction adjacent to a rear end of the circular cam groove 82.

The rear end portion of the swinging bar 76 protrudes outward so that a forward-facing engaging edge 85 is formed. A projection 89, which is formed from plastic as an integral part of the knob 26, is caused to protrude from the knob 26. The pins 74 and 77 and the projection 89 correspond respectively to the guide groove 80, circular can groove 82 and guide groove 84. When the pressing bar assembly 72*a* is inverted and superimposed on the guide plate 32, the pin 74 is inserted into the guide groove 80, the pin 77 is inserted into the circular cam groove 82, and the projection 89 is inserted into the guide groove 84. Next, when the pressing-bar assembly 72*a* is caused to slide between the frame body 20 (FIG. 5) and the guide plate 32, the pin 74 performs a reciprocating motion along the guide groove 80, the pin 77 moves in a counterclockwise direction along the circular cam groove 82, and the projection 89 performs a reciprocating motion along the guide groove 84.

Figure 8:
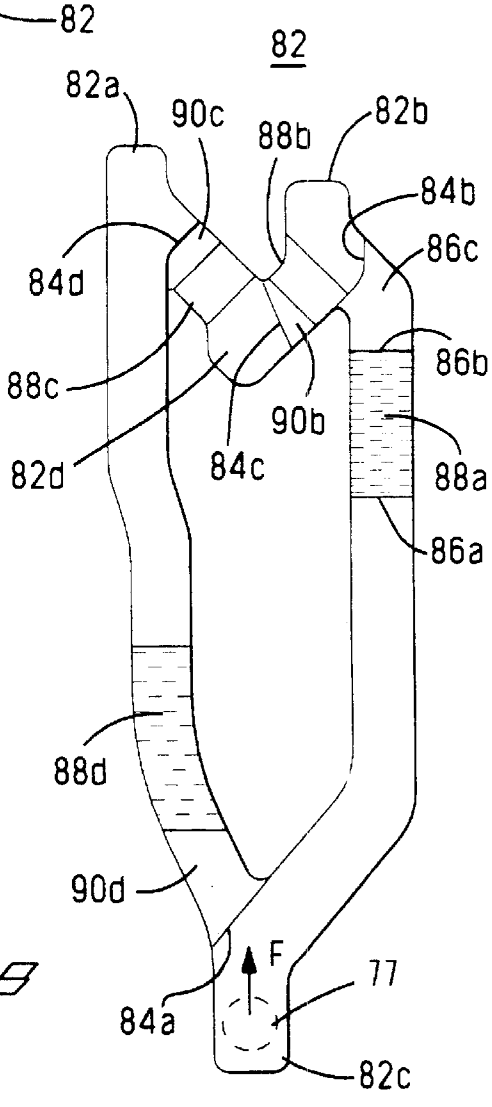
FIG. 8 is an enlarged view which illustrates the circular cam groove.

FIG. 8 is an enlarged view of the circular cam groove 82 shown in FIG. 7. The circular cam groove 82 has two separated end portions 82*a* and 82*b* at a front end, and one end portion 82*c* at a rear end. When the pressing bar 22*a* is pushed forward, the pin 77 advances in the direction indicated by arrow F; however, since there is a vertical wall 84*a* on the left side, the pin 77 advances along the path to the right. An inclined surface 88*a* (indicated by shading in FIG. 8) is formed from point 86*a* to point 86*b* in the cam groove 82, so that inclined surface 88*a* rises toward the viewer of FIG. 8. Furthermore, this path communicates via a flat surface 86*c* with the end portion 82*b,* which is lowered a step by a vertical wall 84*b;* accordingly, forward movement of the pin 77 is stopped at the end portion 82*b.*

Next, when the pushing of the pressing bar 22*a* is relaxed, the pin 77 moves rearward in linkage with the return of the pressing bar 22*a*. However, the advance of the pin 77 to the right is restricted by the vertical wall 84*b,* so that the pin 77 is seated in the inner position 82*d* via an inclined surface 88*b,* which is inclined upward (i. e., which is inclined so that the cam groove 82 becomes narrow) and a flat surface 90*b.* Next, when the pressing bar 22*a* is again pushed, the pin 77 is prevented from moving to the right by a vertical wall 84*c,* and therefore moves to the left, i.e., toward the end portion 82*a.* The pin 77 then reaches the end portion 82*a* via a similar inclined surface 88*c* and flat surface 90*c,* so that the pressing bar 22*a* cannot be pushed in any further. Then, when the force pushing the pressing bar 22*a* is relaxed, the pin 77 is prevented from moving toward the inner position 82*d* by the vertical wall 84*d;* as a result, the pin 77 moves toward the end portion 82*c.* The pin 77 then returns to the end portion 82*c* via an inclined surface 88*d* and a flat surface 90*d.*

Figure 9D:
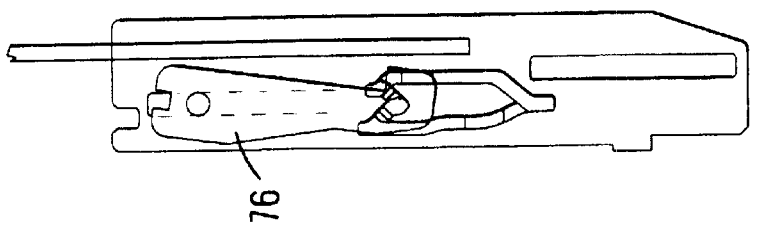
FIGS. 9*a*–9*d* are schematic diagrams which illustrate the step-by-step movements of the swinging bar accompanying the pressing of the pressing bar.
Figure 9C:
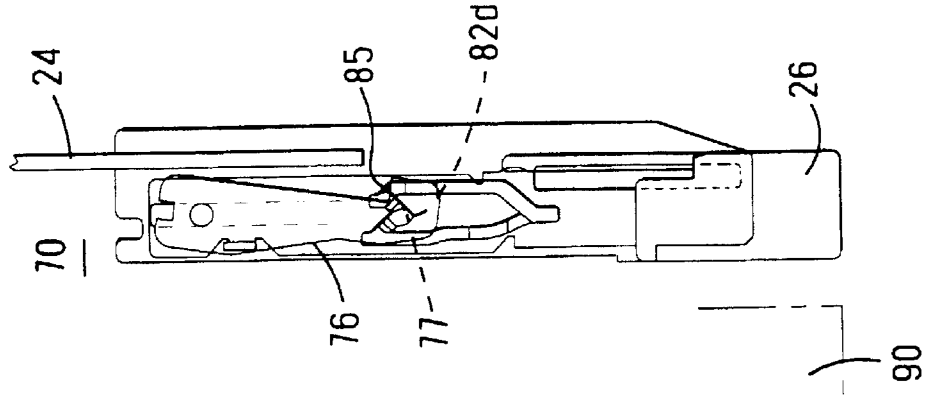
Figure 9B:
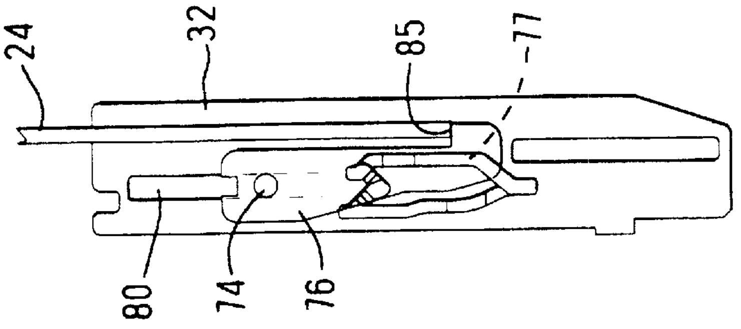
Figure 9A:
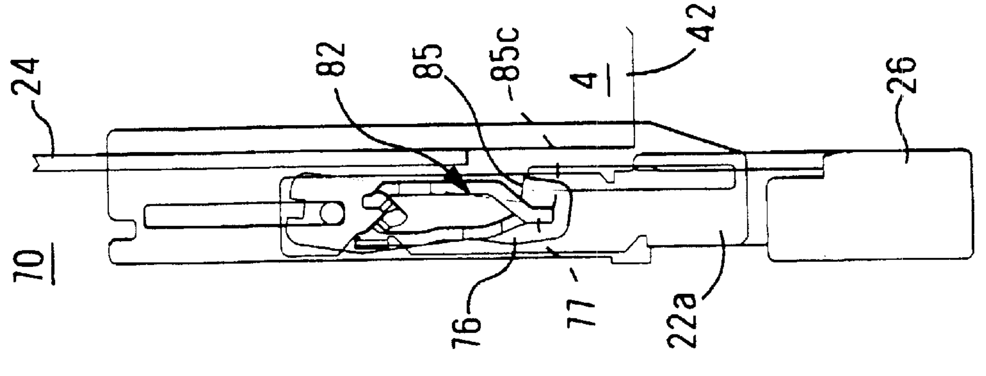

FIGS. 9*a*–9*d* show a series of plan views which show, step by step, the movements of the swinging bar 76 accompanying the actions of the pressing bar 22*a* used to eject the PC card 2. FIG. 9*a* shows a state in which the pressing bar 22*a* is in the initial position. In this case, the knob 26 protrudes rearward from the rear end of the frame 4 by a considerable amount. The axial line of the swinging bar 76 is substantially in line with the pressing bar 22*a,* and the pin 77 is seated in the end portion 82*c* of the circular cam groove 82. The engaging edge 85 does not protrude within the plane of the eject bar 24. The PC card 2 is accommodated inside the frame 4, although this is not shown.

In FIG. 9*b,* the pressing bar 22*a* is omitted, and only the guide plate 32 and the swinging bar 76 are shown. When the pressing bar 22*a* is pushed, the eject bar 24 and engaging edge 85 engage when the pin 77 is at the position shown in FIG. 9*b,* so that the eject bar 24 is pushed forward. As a result, the PC card 2 begins to be driven rearward for ejection. Furthermore, the pin 74 of the pressing bar 22*a* moves forward along the guide groove 80, so that the front end of the pressing bar 22*a* is stably held.

FIG. 9*c* shows a state in which the pin 77 is seated in the inner position 82*d* after the swinging bar 76 has pushed the eject bar 24 so that the PC card 2 has been ejected. In this case, since the knob 26 is pushed inward, positioning in substantially the same plane as the surface of the housing 90 of the device is possible. Since the engaging edge 85 does not protrude to the side in this state, the eject bar 24 can freely slide forward and rearward; accordingly, another PC card can be inserted in this state. Since the PC card 2 is thus ordinarily used in a state in which the knob 26 is pushed in, the knob does not catch on other members or interfere with the operation.

FIG. 9*d* illustrates the process by which the knob 26 is temporarily pressed and the pressing bar 22*a* is caused to return to the initial position shown in FIG. 9*a* in order to eject another PC card. During this return, the swinging bar 76 is caused to move away from the eject bar 24 so that there is no interference between the two parts.

FIGS. 10*a*–10*d* show views similar to those of FIGS. 9*a*–9*d* which illustrate another embodiment of the guide plate assembly 70'. Here, referring to FIG. 10*a,* the shape of the circular cam groove 82' in the guide plate 32' is different. Specifically, only an inclined surface 88*d*' and a vertical wall 84' are formed in the cam groove 82'; the remaining portions of the cam groove 82' all have the same depth. The swinging bar 76' is similarly pivot mounted on the front end portion of the pressing bar 22*a*', and has an engaging edge 85'. A cut-out 102 is formed in the rear end of the swinging bar 76'.

A spring member 104, which is biased in a leftward direction, is attached to the knob 26'. An end of the spring member 104 engages with the cut-out 102, so that the swinging bar 76' is constantly biased away from the eject bar 24', i. e., toward the left.

Figure 10A:
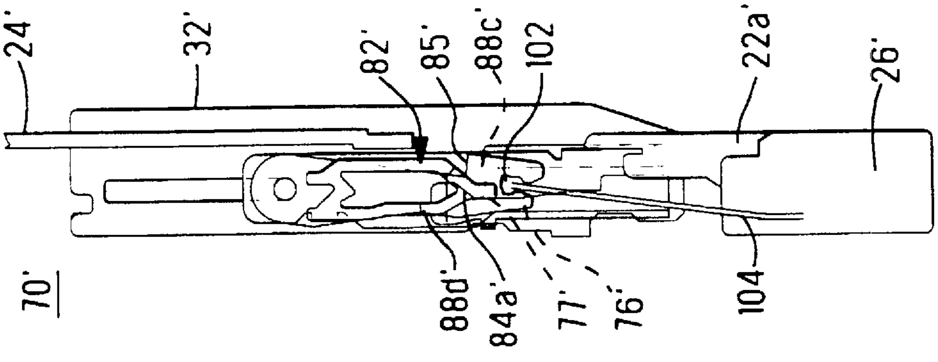
FIGS. 10*a*–10*d* are schematic diagrams similar to those shown in FIGS. 9*a*–9*d* showing another embodiment of the guide plate assembly.
Figure 10B:
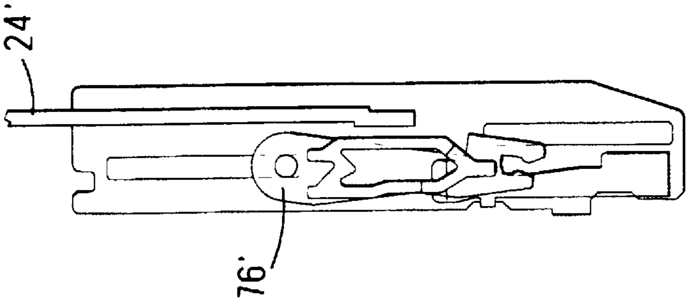

FIG. 10*a* shows a state in which the pin 77' is seated in the outer position, i. e., in the end portion 82*c*'. As in the case of the embodiment illustrated in FIGS. 9*a*–9*d*, the pin 77' is regulated by the vertical wall 84*a*' when the knob 26' is pressed, thus causing the swinging bar 76' to move so that the engaging edge 85' and eject bar 24' engage with each other.

Figure 10C:
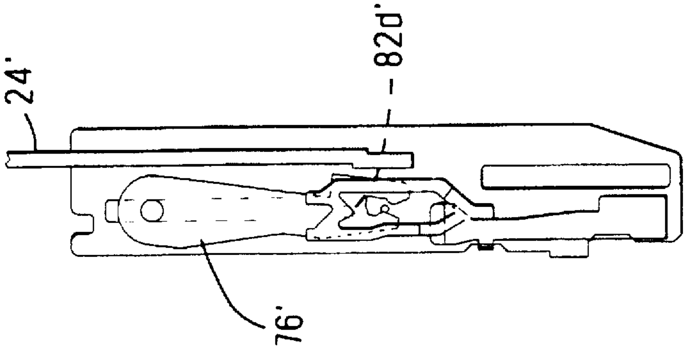

FIG. 10*c* is a plan view similar to FIG. 9*c* which shows a state in which ejection of the PC card (not shown) has been completed. Since the swinging bar 76' is constantly driven to the left by the spring member 104, there is no danger that the pin 77' will return before the pin 77' is seated in this end, i. e., in the inner position 82*d*', even though there is no vertical wall.

Figure 10D:
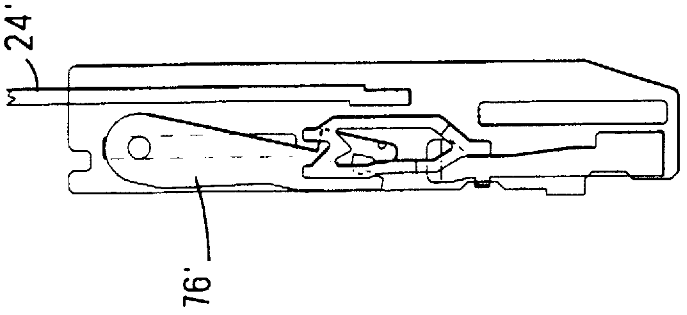
Figure 11:
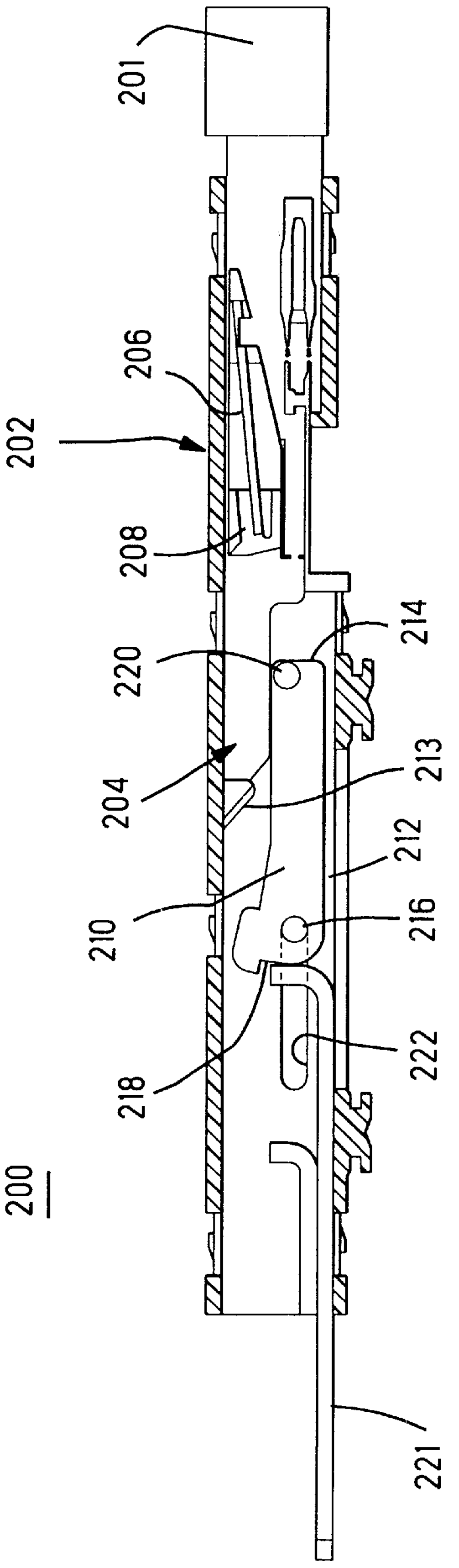
Fig. 11 Prior Art
FIG. 11 is a cross-sectional view of a conventional PC card connector.

FIG. 10*d* is a plan view similar to FIG. 9*d* which shows an intermediate point in the process in which the knob is again pressed so that the swinging bar 76' is caused to return. The swinging bar 76' returns without any interference between the engaging edge 85' of the swinging bar 76' and the eject bar 24'.

The present invention has been described in detail above. However, it goes without saying that various modifications and alterations are possible.

The PC card connector of the present invention is constructed so that a swinging bar guided by a circular cam groove formed in a guide place is moved laterally and engages with an eject bar, the ejecting a PC card from the connector, only when the swinging bar moves from an outer position in the circular cam groove to an inner position therein. Accordingly, the PC card connector of the present invention possesses the following important features:

Specifically, a PC card can be inserted even when the knob is pressed in; accordingly, the operating characteristics of the card connector are good. Furthermore, a low-operating force is obtained by means of a relatively simple structure. Moreover, a PC card connector with a small number of parts is obtained. Since the knob does not protrude either when the connector is in use or when the connector is not in use, faulty operation caused by the knob catching on other member or on the fingers, etc., can be prevented.

What is claimed is:

1. A PC card connector comprising:

a frame in which a PC card is received for electrical connection with an electrical connector, an ejection member pivotally mounted to the frame, a reciprocally-operated eject bar connected to one end of the ejection member for pivotally operating the ejection member to eject a PC card from the card connector, a pressing surface provided at an end of the eject bar which extends beyond the frame;

a guide plate assembly operatively connected to the eject bar to reciprocally operate the eject bar including a pressing bar and a guide plate along which the pressing bar moves, a swinging bar connected between the pressing bar and the guide plate, said switching bar having one end pivotally connected to said pressing bar and another end disposed in a single, non-symmetrical cam groove forming a closed curve in the guide plate so that when the pressing bar is moved from an initial position to a card-ejection position in one continuous movement, the swinging bar engages the eject bar thereby moving the eject bar to a card-ejection position;

at least one biasing spring provided between the frame and the pressing bar, the at least one biasing spring being offset from the longitudinal axis of the pressing bar, the positioning of the at least one biasing spring allows the continuous movement of the pressing bar from the initial position to the card-eject position to have a long stroke to minimize the force required for the movement.

2. A PC card connector as claimed in claim 1, wherein said cam groove forming a closed curve has an outer position and an inner position so that when the pressing bar is moved from the initial position to the card-ejection position, the switching bar engages the eject bar as the other end of the swinging bar moves from the outer position to the inner position of the cam groove forming a closed circle.

3. A PC card connector as claimed in claim 1, wherein a spring engages said swinging bar thereby biasing said swinging bar toward said guide plate.

4. A PC card connector as claimed in claim 1, wherein a spring engages said swinging bar thereby biasing said swinging bar away from said eject bar.

* * * * *